United States Patent [19]
Dupuis et al.

[11] 3,710,159
[45] Jan. 9, 1973

[54] ELECTRIC BRUSH AND LEAD HOLDER

[75] Inventors: Maurice V. Dupuis, Raytown, Mo.; John R. Greer, Shawnee Mission, Kans.

[73] Assignee: Rival Manufacturing Company, Kansas City, Mo.

[22] Filed: July 15, 1971

[21] Appl. No.: 162,906

[52] U.S. Cl. ................................310/239, 310/249
[51] Int. Cl. ..............................................H02k 13/00
[58] Field of Search......310/239, 242, 245, 246, 247, 310/249, 240

[56] References Cited

UNITED STATES PATENTS

| | | |
|---|---|---|
| 2,045,293 | 6/1936 | Carlson .................................310/245 |
| 3,445,705 | 5/1969 | Fuller....................................310/247 |
| 3,513,343 | 5/1970 | Harvey..................................310/247 |
| 3,112,419 | 11/1963 | Dobslaw...............................310/239 |
| 3,127,533 | 3/1964 | Gardner................................310/239 |
| 3,441,766 | 4/1969 | Amrein .................................310/239 |

Primary Examiner—R. Skudy
Attorney—Scofield, Kokjer, Scofield & Lowe

[57] ABSTRACT

A combination electric brush and lead holder for electric motors has a spring located therein which urges the associated brush to extend outwardly of the holder in a telescoping fashion and into contact with a motor commutator. The spring is interposed between the inner end of the brush and a disc shaped terminal end of an electrical lead within the holder structure and is both current carrying and resilient.

4 Claims, 4 Drawing Figures

PATENTED JAN 9 1973                     3,710,159

INVENTOR
Maurice V. Dupuis

BY Scofield, Lokjen, Scofield & Lowe
ATTORNEYS

ELECTRIC BRUSH AND LEAD HOLDER

BACKGROUND AND BRIEF DESCRIPTION OF THE INVENTION

The prior art includes devices for holding a carbon brush and the connection with an associated electrical lead. Such a device is generally shown in U. S. Pat. No. 3,376,444 and includes a brush holder structure with the carbon brush slidably fitting therein. A resilient conductive brush spring is inserted into a precise hole in what is referred to as a "hole in the head" brush with the opposite end of the spring contacting a "pigtail lead connection" that generally extends out the rear end of the brush holder structure and designed to be attached to the electrical leads for the fractional horsepower motors.

The subject invention includes the unique design of the brush and lead holder combination for fractional horsepower electrical motors that utilizes the conductive spring concept (or other conductive resilient means) to urge the carbon brush outwardly therefrom and into contact with the motor commutator. The spring is interposed between the inner end of the brush and a disc shaped terminal end of an electrical lead that is located within the holder structure. The holder is appropriately apertured to permit the insertion of the disc shaped terminal of the electrical lead in a proper relationship with respect to the conductive spring.

An object of the invention is to provide a uniquely constructed electric brush and lead holder for use with electric motors.

Another object of the invention is to provide a uniquely constructed brush holder that is easy to assemble, safe to utilize, and convenient for interconnecting and detaching purposes.

A further object of the invention is to provide an electrical motor attachment that has eliminated the need for soldered lead connections, pigtail leads and other sometimes cumbersome lead-brush interconnects.

A still further object of the invention is to provide a totally insulated motor brush holder termination that requires no additional insulation or shielding.

Other and further objects of the invention, together with the features of novelty appurtenant thereto, will appear in the course of the following description.

DETAILED DESCRIPTION OF THE INVENTION

In the accompanying drawing, which forms a part of the specification and is to be read in conjunction therewith and in which like reference numerals are employed to indicate like parts in the various views.

Figure 1:
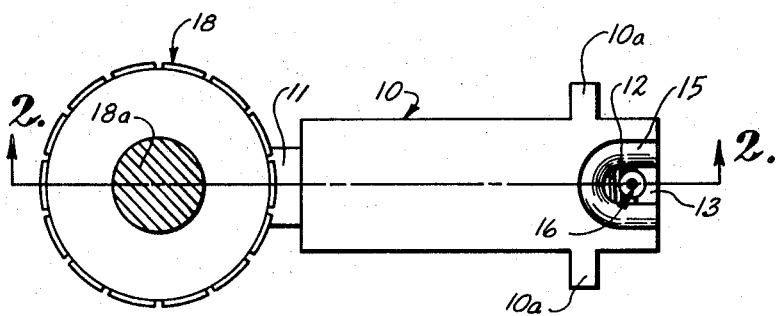
FIG. 1 is a top plan view of the combination brush and electrical lead holder in operative position with respect to an electric motor commutator.

Turning now more particularly to the drawing, reference numeral 10 generally represents the holder for the electrical brush and associated electrical lead. The holder is substantially in the shape of a rectangular cube (alternatively a round or cylindrical shape could be used) with one end being open and with the interior portion being hollow or cavity-like to facilitate the telescoping sliding fit of the rectangularly shaped carbon brush 11. The rearward end of brush 11 may have an annular bore or recess 10b to facilitate the reception of the small end of a conductive spring member 12 which is similar to that shown in the above-mentioned U.S. Pat. No. 3,376,444. Alternatively, a copper or brass sleeve member could be utilized with the spring as a sliding conductive member.

Figure 4:
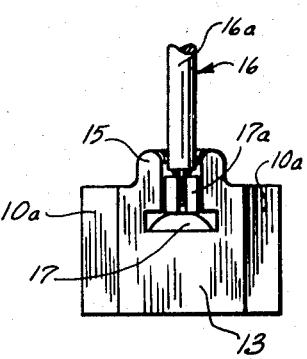
FIG. 4 is a rear elevational view of the rear or outer end of the combination electrical brush and lead holder shown in the various views.
Figure 2:
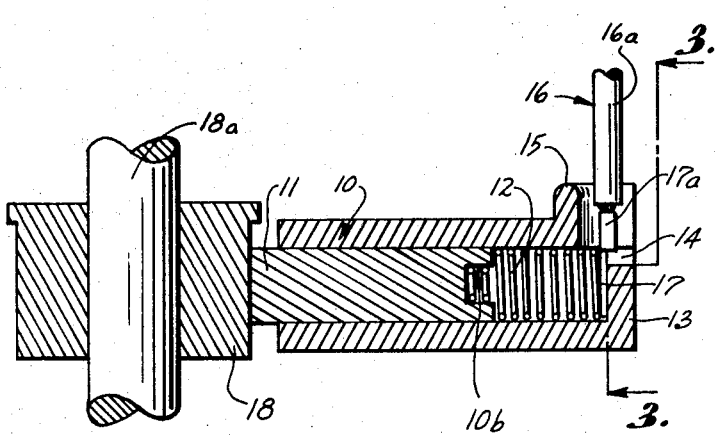
FIG. 2 is a sectional view taken generally along the line 2—2 of FIG. 1 in the direction of the arrows.
Figure 3:
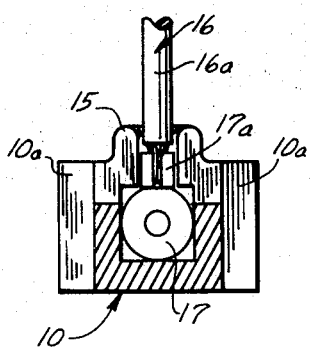
FIG. 3 is an end sectional view taken generally along the line 3—3 of FIG. 2 in the direction of the arrows.

The rear end portion of holder 10 is partially closed by the integrally formed rear wall 13 which extends in a substantially vertical plane (as shown in the various views). An inverted T-shaped opening 14 is defined in rear wall 13 (when viewed from the rear as shown in FIG. 4) and is formed, in part, by the raised U-shaped (as seen from above as in FIG. 1) rim 15. This rim (15) is located on the upper rearward portion of the holder and partially circumscribes a communicating opening from the exterior to the interior of the holder. The rearmost portion of the U-shaped rim (that being the opened portion of the U) forms the vertical portion of the inverted T-shaped opening 14 and provides suitable clearance for inserting and locating the electrical lead as will be described later. It is therefore seen that opening 14 actually occupies two planes that are normal or at right angles to each other.

The above-mentioned lead (hereinafter generally identified by the numeral 16) is insulated at 16a and has a disc shaped electrical terminal 17 located on the end thereof by crimping (and soldering) the collar member 17a to the actual wire of the lead. In assembling the holder, the electrical lead, including the disc terminal 17, is first put in place by inserting disc terminal 17 through the horizontal portion of the inverted T-shaped slot 14 (in wall 13) and then reorienting the lead so that the disc terminal 17 is in place substantially flush against the forward surface of the rear wall 13 of holder 10. (In this position, the lead 16 extends only through the opening circumscribed by rim 15 and not through the opening in wall 14.) Spring 12 may then be inserted to resiliently contact terminal 17 (with brush 11 on the opposite side of the spring) so that terminal 17 is forced against the rear wall. At the same time, brush 11 is urged against the commutator 18 of an electrical motor which has the associated motor shaft 18a. The lead, having the disc shaped terminal 17 thereon, is precluded from being removed from the holder since the diameter of the disc is substantially greater than the width of the slot formed by the U-shaped rim 15. Further, with the conductive spring 12 maintaining the disc flattened against the rear wall 13, it is impossible for the disc terminal to orient itself so that it may inadvertently slip out of the horizontal slot portion of T-shaped opening 14.

Finally, the entire brush block-electrical lead holder includes the side flanges 10a. These flanges are integrally formed with the holder 10 and bear against the outer surface of the motor housing as the holder extends through a suitable opening. In this fashion, a brush holder clip may contact the rearward surface of the holder and fixedly locate same in proper position with respect to the commutator 18.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described our invention, we claim:

1. A device for holding an electric brush and at least one associated lead, said device comprising
   a holder structure having a cavity therein with at least one end of said holder structure defining an opening therein,
   an electric brush having two end portions, said brush positioned within said cavity and having a first end portion extending through said opening in said holder structure,
   a resilient conducting member in contact with the second end portion of said brush and positioned interiorly of said structure within said cavity,
   an electrical lead having a terminal end with a predetermined shape, said holder structure having another opening defined therein, said last mentioned opening conforming to the shape of said terminal end so that said terminal end may be oriented to pass unrestricted therethrough, said terminal being placed in contact with said resilient conducting member to urge said terminal end to a position orientation interiorly of said holder structure within said cavity that precludes said terminal end from being removed from said holder cavity through said last mentioned opening in said holder structure, and wherein said last mentioned opening in said holder structure lies in at least two planes, said terminal end being insertible through said opening in one plane and movable to the operating position in the other plane to extend therethrough during normal operation.

2. The invention as in claim 1 wherein said lead terminal is disc shaped, said resilient conductive member being operable to urge said disc shaped terminal end to a position that precluded said end from being removed from said holder cavity through said last mentioned opening.

3. The combination as in claim 1 wherein said last mentioned opening lies in at least two planes which are normal to each other.

4. The invention as in claim 3 wherein said lead terminal is disc shaped, said resilient conductive member being operable to urge said disc shaped terminal end to a position that precluded said end from being removed from said holder cavity through said last mentioned opening.

* * * * *